(12) United States Patent
Rouady et al.

(10) Patent No.: US 9,307,288 B2
(45) Date of Patent: Apr. 5, 2016

(54) TELEVISION SIGN ON FOR PERSONALIZATION IN A MULTI-USER ENVIRONMENT

(75) Inventors: William Rouady, Purcellville, VA (US); Stephen Scheirey, Urbana, MD (US); Daniel Ramagem, North Bethesda, MD (US)

(73) Assignee: HILLCREST LABORATORIES, INC., Rockville, MD (US)

( * ) Notice: Subject to any disclaimer, the term of this patent is extended or adjusted under 35 U.S.C. 154(b) by 0 days.

(21) Appl. No.: 13/703,399

(22) PCT Filed: Jun. 23, 2011

(86) PCT No.: PCT/US2011/041642
§ 371 (c)(1),
(2), (4) Date: Dec. 11, 2012

(87) PCT Pub. No.: WO2011/163481
PCT Pub. Date: Dec. 29, 2011

(65) Prior Publication Data
US 2013/0088650 A1    Apr. 11, 2013

Related U.S. Application Data

(60) Provisional application No. 61/357,573, filed on Jun. 23, 2010.

(51) Int. Cl.
| | | |
|---|---|---|
| G06F 3/00 | (2006.01) |
| G06F 13/00 | (2006.01) |
| H04N 5/445 | (2011.01) |
| H04N 21/45 | (2011.01) |
| H04N 21/475 | (2011.01) |

(Continued)

(52) U.S. Cl.
CPC ....... *H04N 21/4532* (2013.01); *H04N 5/44582* (2013.01); *H04N 21/4432* (2013.01); *H04N 21/454* (2013.01); *H04N 21/4508* (2013.01); *H04N 21/475* (2013.01); *H04N 21/4751* (2013.01); *H04N 21/4753* (2013.01)

(58) Field of Classification Search
CPC .......... H04N 21/4508; H04N 21/4532; H04N 21/475; H04N 21/4751; H04N 21/4753
USPC .................................... 725/25–31, 37–39, 46
See application file for complete search history.

(56) References Cited

U.S. PATENT DOCUMENTS

| | | | |
|---|---|---|---|
| 6,339,826 B2 * | 1/2002 | Hayes et al. ................. | 713/166 |
| 6,374,237 B1 | 4/2002 | Reese | |
| 7,139,983 B2 | 11/2006 | Kelts | |

(Continued)

FOREIGN PATENT DOCUMENTS

| | | |
|---|---|---|
| JP | 5-83263 A | 4/1993 |
| KR | 10-2010-0011430 A | 2/2010 |

OTHER PUBLICATIONS

International Search Report in corresponding International Application No. PCT/US2011/041642 mailed Feb. 9, 2012.

(Continued)

*Primary Examiner* — Jeremy Duffield
(74) *Attorney, Agent, or Firm* — Patent Portfolio Builders PLLC

(57) ABSTRACT

Systems and methods according to the present invention provide sign on systems for devices, e.g., televisions, which balance ease of use with security and access control that is amenable to, e.g., household usage.

14 Claims, 6 Drawing Sheets

(51) Int. Cl.
*H04N 21/443* (2011.01)
*H04N 21/454* (2011.01)

(56) References Cited

U.S. PATENT DOCUMENTS

| | | | |
|---|---|---|---|
| 7,158,118 | B2 | 1/2007 | Liberty |
| 7,236,156 | B2 | 6/2007 | Liberty et al. |
| 7,239,301 | B2 | 7/2007 | Liberty et al. |
| 7,535,456 | B2 | 5/2009 | Liberty et al. |
| 2003/0158945 | A1 | 8/2003 | Liu |
| 2004/0268393 | A1 | 12/2004 | Hunleth et al. |
| 2005/0235319 | A1* | 10/2005 | Carpenter et al. ............... 725/52 |
| 2006/0031529 | A1* | 2/2006 | Keith, Jr. ...................... 709/227 |
| 2006/0048184 | A1* | 3/2006 | Poslinski et al. ................ 725/45 |
| 2006/0250358 | A1 | 11/2006 | Wroblewski |
| 2006/0262116 | A1 | 11/2006 | Moshiri et al. |
| 2007/0035518 | A1 | 2/2007 | Francz et al. |
| 2007/0107017 | A1* | 5/2007 | Angel et al. .................... 725/62 |
| 2011/0237324 | A1* | 9/2011 | Clavin et al. .......... 348/E05.024 |

OTHER PUBLICATIONS

Written Opinion of the International Searching Authority in corresponding International Application No. PCT/US2011/041642 mailed Feb. 9, 2012.

International Preliminary Report on Patentability in corresponding International Application No. PCT/US2011/041642 mailed Jan. 10, 2013.

* cited by examiner

TELEVISION SIGN ON FOR PERSONALIZATION IN A MULTI-USER ENVIRONMENT

RELATED APPLICATION

This application is related to, and claims priority from, U.S. Provisional Patent Application Ser. No. 61/357,573, filed on Jun. 23, 2010, entitled "Multi-Media System Including Single Sign-On Capability", the disclosure of which is incorporated here by reference.

BACKGROUND

Technologies associated with the communication of information have evolved rapidly over the last several decades. Television, cellular telephony, the Internet and optical communication techniques (to name just a few things) combine to inundate consumers with available information and entertainment options. Taking television as an example, the last three decades have seen the introduction of cable television service, satellite television service, pay-per-view movies and video-on-demand. Whereas television viewers of the 1960s could typically receive perhaps four or five over-the-air TV channels on their television sets, today's TV watchers have the opportunity to select from hundreds, thousands, and potentially millions of channels of shows and information. Video-on-demand technology, currently used primarily in hotels and the like, provides the potential for in-home entertainment selection from among thousands of movie titles.

The technological ability to provide so much information and content to end users provides both opportunities and challenges to system designers and service providers. One challenge is that while end users typically prefer having more choices rather than fewer, this preference is counterweighted by their desire that the selection process be both fast and simple. Unfortunately, the development of the systems and interfaces by which end users access media items has resulted in selection processes which are neither fast nor simple. Consider again the example of television programs. When television was in its infancy, determining which program to watch was a relatively simple process primarily due to the small number of choices. One would consult a printed guide which was formatted, for example, as series of columns and rows which showed the correspondence between (1) nearby television channels, (2) programs being transmitted on those channels and (3) date and time. The television was tuned to the desired channel by adjusting a tuner knob and the viewer watched the selected program. Later, remote control devices were introduced that permitted viewers to tune the television from a distance. This addition to the user-television interface created the phenomenon known as "channel surfing" whereby a viewer could rapidly view short segments being broadcast on a number of channels to quickly learn what programs were available at any given time.

Despite the fact that the number of channels and amount of viewable content has dramatically increased, the generally available user interface, control device options and frameworks for televisions has not changed much over the last 30 years. Printed guides are still the most prevalent mechanism for conveying programming information. The multiple button remote control with up and down arrows is still the most prevalent channel/content selection mechanism. The reaction of those who design and implement the TV user interface to the increase in available media content has been a straightforward extension of the existing selection procedures and interface objects. Thus, the number of rows in the printed guides has been increased to accommodate more channels. The number of buttons on the remote control devices has been increased to support additional functionality and content handling, e.g., as shown in FIG. 1. However, this approach has significantly increased both the time required for a viewer to review the available information and the complexity of actions required to implement a selection. Arguably, the cumbersome nature of the existing interface has hampered commercial implementation of some services, e.g., video-on-demand, since consumers are resistant to new services that will add complexity to an interface that they view as already too slow and complex.

In addition to increases in bandwidth and content, the user interface bottleneck problem is being exacerbated by the aggregation of technologies. Consumers are reacting positively to having the option of buying integrated systems rather than a number of segregable components. An example of this trend is the combination television/VCR/DVD in which three previously independent components are frequently sold today as an integrated unit. This trend is likely to continue, potentially with an end result that most if not all of the communication devices currently found in the household will be packaged together as an integrated unit, e.g., a television/VCR/DVD/internet access/radio/stereo unit. Even those who continue to buy separate components will likely desire seamless control of, and interworking between, the separate components. With this increased aggregation comes the potential for more complexity in the user interface. For example, when so-called "universal" remote units were introduced, e.g., to combine the functionality of TV remote units and VCR remote units, the number of buttons on these universal remote units was typically more than the number of buttons on either the TV remote unit or VCR remote unit individually. This added number of buttons and functionality makes it very difficult to control anything but the simplest aspects of a TV or VCR without hunting for exactly the right button on the remote. Many times, these universal remotes do not provide enough buttons to access many levels of control or features unique to certain TVs. In these cases, the original device remote unit is still needed, and the original hassle of handling multiple remotes remains due to user interface issues arising from the complexity of aggregation. Some remote units have addressed this problem by adding "soft" buttons that can be programmed with the expert commands. These soft buttons sometimes have accompanying LCD displays to indicate their action. These too have the flaw that they are difficult to use without looking away from the TV to the remote control. Yet another flaw in these remote units is the use of modes in an attempt to reduce the number of buttons. In these "moded" universal remote units, a special button exists to select whether the remote should communicate with the TV, DVD player, cable set-top box, VCR, etc. This causes many usability issues including sending commands to the wrong device, forcing the user to look at the remote to make sure that it is in the right mode, and it does not provide any simplification to the integration of multiple devices. The most advanced of these universal remote units provide some integration by allowing the user to program sequences of commands to multiple devices into the remote. This is such a difficult task that many users hire professional installers to program their universal remote units.

Some attempts have also been made to modernize the screen interface between end users and media systems. However, these attempts typically suffer from, among other drawbacks, an inability to easily scale between large collections of media items and small collections of media items. For example, interfaces which rely on lists of items may work well for small collections of media items, but are tedious to browse for large collections of media items. Interfaces which rely on hierarchical navigation (e.g., tree structures) may be speedier to traverse than list interfaces for large collections of media items, but are not readily adaptable to small collections of media items. Additionally, users tend to lose interest in selection processes wherein the user has to move through three or more layers in a tree structure. For all of these cases, current remote units make this selection process even more tedious by forcing the user to repeatedly depress the up and down buttons to navigate the list or hierarchies. When selection skipping controls are available such as page up and page down, the user usually has to look at the remote to find these special buttons or be trained to know that they even exist. Accordingly, organizing frameworks, techniques and systems which simplify the control and screen interface between users and media systems as well as accelerate the selection process, while at the same time permitting service providers to take advantage of the increases in available bandwidth to end user equipment by facilitating the supply of a large number of media items and new services to the user have been proposed in U.S. patent application Ser. No. 10/768,432, filed on Jan. 30, 2004, entitled "A Control Framework with a Zoomable Graphical User Interface for Organizing, Selecting and Launching Media Items", the disclosure of which is incorporated here by reference.

TVs exist in a multi-user environment where the same device is typically used by different members of the household at different times, as well as by groups of individuals from both within and outside the household. The current connected TV environment offers many services originally built for the personal computer or mobile platforms as individual experiences that include private information. In addition, other services contain content that may not be appropriate for all the individual members of the household. Accordingly, it would be desirable to provide some sort of security mechanism which addresses these issues.

Existing solutions take a PC-style approach to dealing with the situation (if it is dealt with at all). In most cases, there is simply a single log-in to personalized services and all users of the connected TV or device share the information from the service. This login may occur per service. It can be remembered or may require log-in each time it is used. This makes for either a non-private or tedious scenario which discourages use of such services. Similarly, content services often require a login to enable the acquisition of age appropriate content each time such content is requested, which is also a tedious solution.

Alternatively, some solutions require a login into the entire system by the user in order to enable any private or restricted services. This is a traditional PC approach. It can be effective in single person homes if the login is remembered, however it does not account for the visitor user. The outside visitor is often referred to as the "babysitter factor."

Accordingly, it would be desirable to provide other sign-on solutions which are, for example, particularly adapted to the TV environment and which balances security and ease of use.

SUMMARY

According to one exemplary embodiment, a method for controlling access to media content and services via a system includes the steps of receiving a first input to turn on the system, activating a default user profile which permits access to a first set of media content and services via the system without requiring validation of a system user's identity, receiving a request to switch from the default user profile to another profile, validating the request, and activating, if the request is validated, the another profile which permits access to a second set of media content and services via the system that is different from the first set of media content and services.

According to another embodiment, a controller for controlling access to media content and services through a television includes at least one interface configured to receive inputs from a user, a processor configured to receiving a first input associated with turning on the television and, in response to the first input, further configured to activate a default user profile which permits access to a first set of media content and services via the television without requiring validation of a system user's identity, wherein the at least one interface is further configured to subsequently receive a request to switch from the default user profile to another profile, wherein the processor is further configured to validate the request and to activate, if the request is validated, the another profile which permits access to a second set of media content and services via the system that is different from the first set of media content and services.

According to yet another exemplary embodiment, a television includes a display configured to display media content and service content which is accessible via a user interface, and a processor configured to generate a user interface, and control access to said media content and service content, in accordance with a currently active user profile; wherein the processor is further configured to use a default user profile as the currently active user profile upon power on of the television.

BRIEF DESCRIPTION OF THE DRAWINGS

The accompanying drawings illustrate exemplary embodiments of the present invention, wherein.

DETAILED DESCRIPTION

Figure 1:
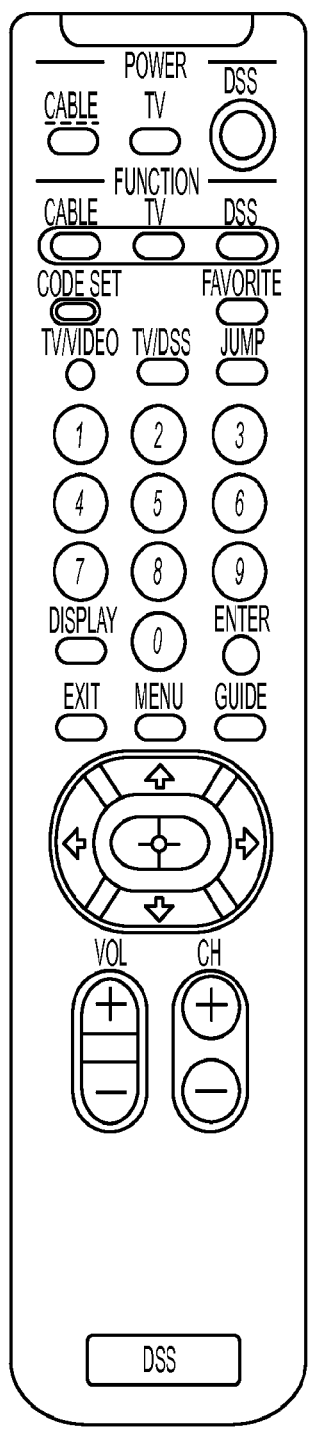
FIG. 1 depicts a conventional remote control unit for an entertainment system.

The following detailed description of the invention refers to the accompanying drawings. The same reference numbers in different drawings identify the same or similar elements. Also, the following detailed description does not limit the invention. Instead, the scope of the invention is defined by the appended claims.

Exemplary embodiments provide a sign-on system and method that allow for the connected TV and devices interface to be personalized to an individual or a group so that various services can accommodate the viewer. Exemplary aspects of the system according to such embodiments include its streamlined login procedure, remote management features, and default behaviors to minimize inadvertent privacy violations in normal system use. Exemplary embodiments define a framework where the user can customize their experience and utilize a variety of access options based upon their personal tastes, interest and experience. Moreover, these embodiments provide for a "casual" security model that is adapted to TV usage and which prevents inadvertent access to another user's information without excessive security controls.

Prior to discussing such embodiments in detail, and in order to provide some context for this discussion, an exemplary aggregated media system 200 in which the present invention can be implemented will first be described with respect to FIG. 2. Those skilled in the art will appreciate, however, that the present invention is not restricted to implementation in this type of media system and that more or fewer components can be included therein. Therein, an input/output (I/O) bus 210 connects the system components in the media system 200 together. The I/O bus 210 represents any of a number of different of mechanisms and techniques for routing signals between the media system components. For example, the I/O bus 210 may include an appropriate number of independent audio "patch" cables that route audio signals, coaxial cables that route video signals, two-wire serial lines or infrared or radio frequency transceivers that route control signals, optical fiber or any other routing mechanisms that route other types of signals.

In this exemplary embodiment, the media system 200 includes a television/monitor 212, a video cassette recorder (VCR) 214, digital video disk (DVD) recorder/playback device 216, audio/video tuner 218 and compact disk player 220 coupled to the I/O bus 210. The VCR 214, DVD 216 and compact disk player 220 may be single disk or single cassette devices, or alternatively may be multiple disk or multiple cassette devices. They may be independent units or integrated together. In addition, the media system 200 includes a microphone/speaker system 222, video camera 224 and a wireless I/O control device 226. According to exemplary embodiments of the present invention, the wireless I/O control device 226 is a 3D pointing device. The wireless I/O control device 226 can communicate with the entertainment system 200 using, e.g., an IR or RF transmitter or transceiver. Alternatively, the I/O control device can be connected to the entertainment system 200 via a wire. One or more hard drives (or disks or flash drives) 280 can be provided for storage of recorded video, music or other media.

The entertainment system 200 also includes a system controller 228. According to one exemplary embodiment of the present invention, the system controller 228 operates to store and display entertainment system data available from a plurality of entertainment system data sources and to control a wide variety of features associated with each of the system components. As shown in FIG. 2, system controller 228 is coupled, either directly or indirectly, to each of the system components, as necessary, through I/O bus 210. In one exemplary embodiment, in addition to or in place of I/O bus 210, system controller 228 is configured with a wireless communication transmitter (or transceiver), which is capable of communicating with the system components via IR signals or RF signals. Regardless of the control medium, the system controller 228 is configured to control the media components of the media system 200 via a graphical user interface described below.

Figure 2:
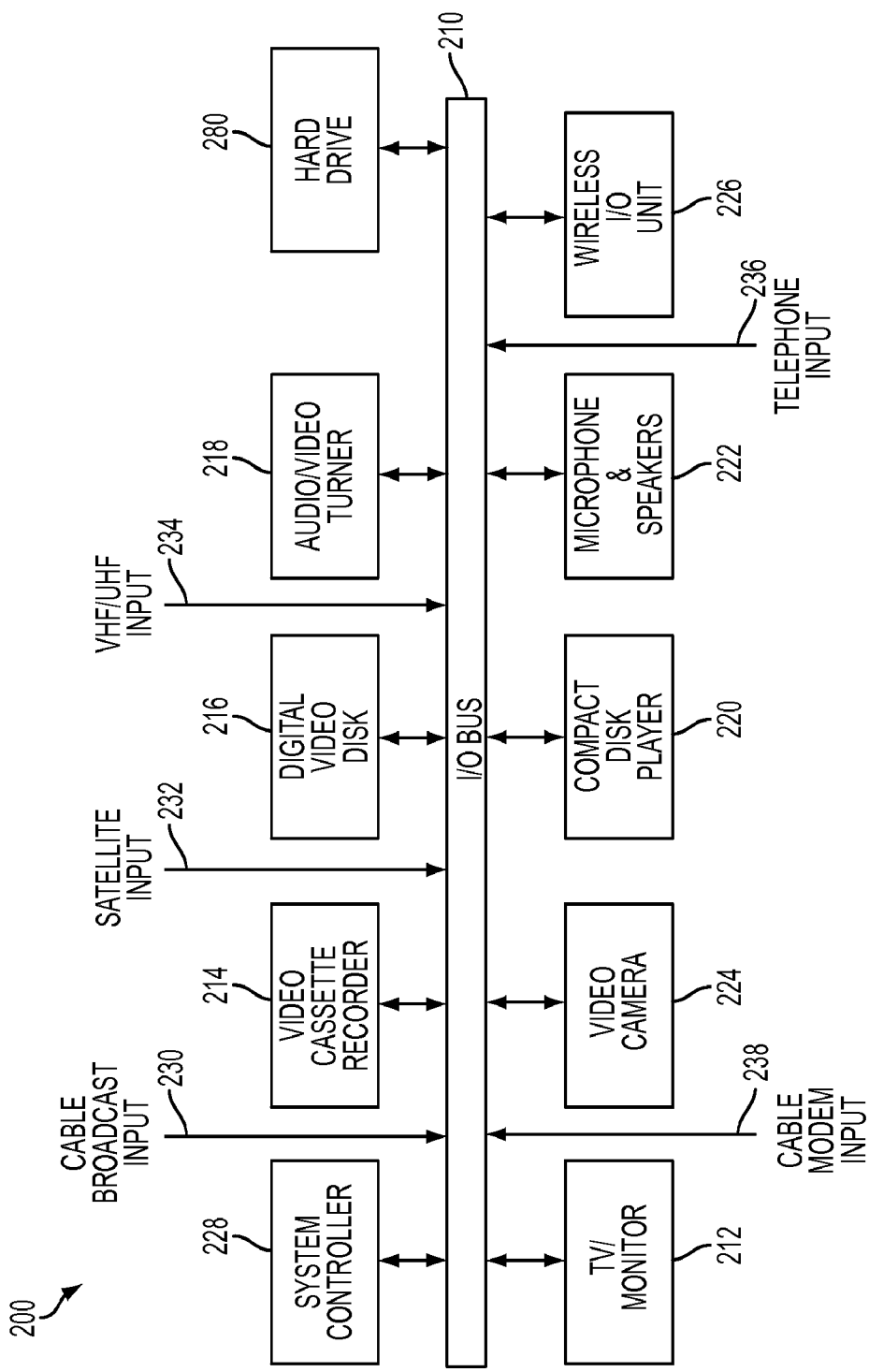
FIG. 2 depicts an exemplary media system in which exemplary embodiments of the present invention can be implemented.

As further illustrated in FIG. 2, media system 200 may be configured to receive media items from various media sources and service providers. In this exemplary embodiment, media system 200 receives media input from and, optionally, sends information to, any or all of the following sources: cable broadcast 230, satellite broadcast 232 (e.g., via a satellite dish), very high frequency (VHF) or ultra high frequency (UHF) radio frequency communication of the broadcast television networks 234 (e.g., via an aerial antenna), telephone network 236 and cable modem 238 (or another source of Internet content). Those skilled in the art will appreciate that the media components and media sources illustrated and described with respect to FIG. 2 are purely exemplary and that media system 200 may include more or fewer of both. For example, other types of inputs to the system include AM/FM radio and satellite radio.

More details regarding this exemplary entertainment system and frameworks associated therewith can be found in the above-incorporated by reference U.S. Patent Application entitled "A Control Framework with a Zoomable Graphical User Interface for Organizing, Selecting and Launching Media Items". Additionally, the interested reader is also referred to U.S. patent application Ser. No. 11/437,215, entitled "Global Navigation Objects in User Interfaces", filed on May 19, 2006, the disclosure of which is incorporated here by reference. Alternatively, remote devices and interaction techniques between remote devices and user interfaces in accordance with the present invention can be used in conjunction with other types of systems, for example computer systems including, e.g., a display, a processor and a memory system or with various other systems and applications.

Figure 3A:
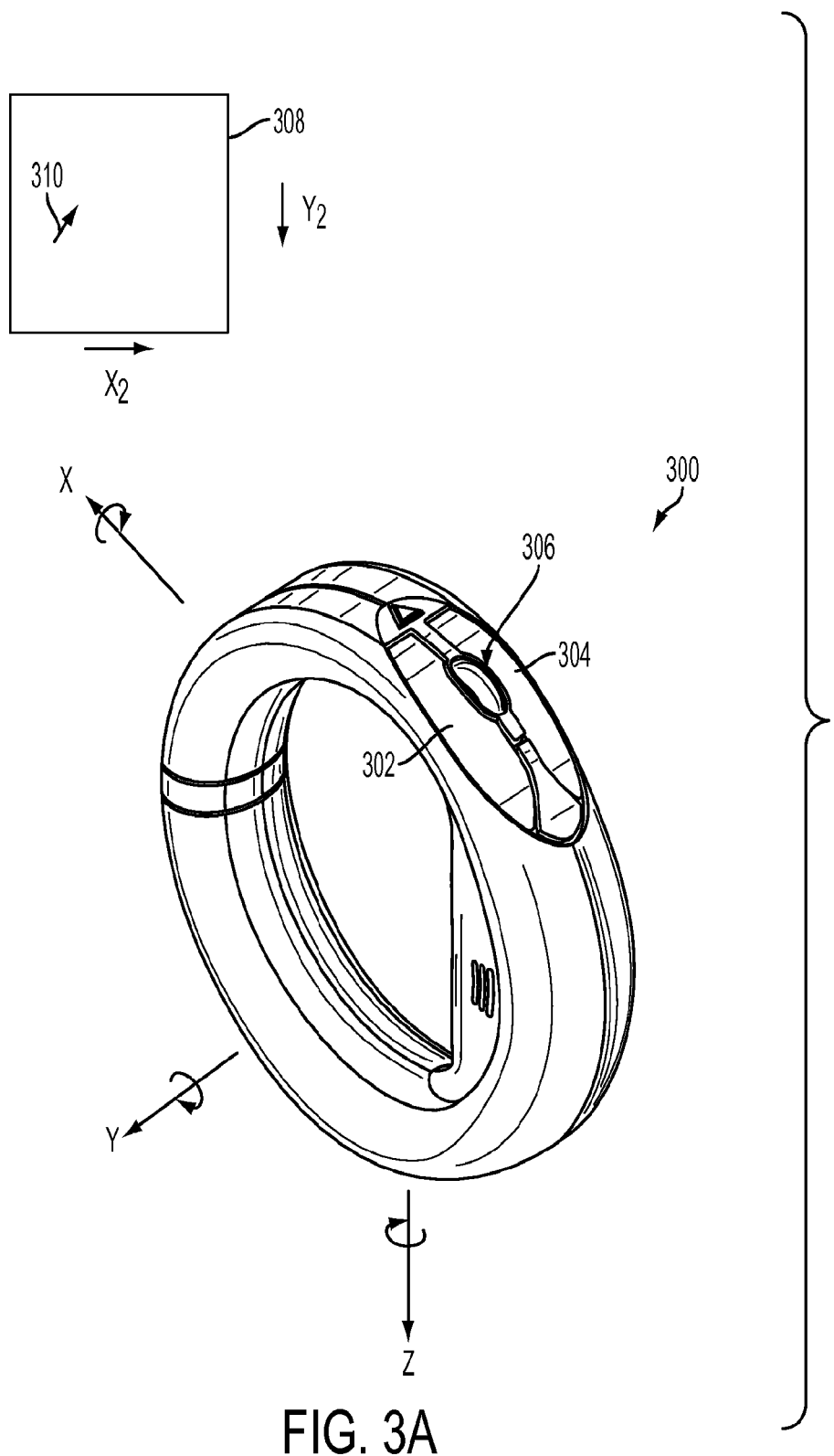
FIG. 3(a) shows a 3D pointing device with which exemplary embodiments can be implemented.

As mentioned in the Background section, remote devices which operate as 3D pointers are of particular interest for the present specification, although the present invention is not limited to systems including 3D pointers and may be used with 2D devices or remote control devices such as that illustrated in FIG. 1. However 3D pointing devices enable the translation of movement of the device, e.g., linear movement, rotational movement, acceleration or any combination thereof, into commands to a user interface. An exemplary loop-shaped, 3D pointing device 300 is depicted in FIG. 3(a), however the present invention is not limited to loop-shaped devices. In this exemplary embodiment, the 3D pointing device 300 includes two buttons 302 and 304 as well as a scroll wheel 306 (scroll wheel 306 can also act as a button by depressing the scroll wheel 306), although other exemplary embodiments will include other physical configurations. User movement of the 3D pointing device 300 can be defined, for example, in terms of rotation about one or more of an x-axis attitude (roll), a y-axis elevation (pitch) or a z-axis heading (yaw). In addition, some exemplary embodiments of the present invention can additionally (or alternatively) measure linear movement of the 3D pointing device 300 along the x, y, and/or z axes to generate cursor movement or other user interface commands. An example is provided below. A number of permutations and variations relating to 3D pointing devices can be implemented in systems according to exemplary embodiments of the present invention. The interested reader is referred to U.S. patent application Ser. No. 11/119, 663, entitled (as amended) "3D Pointing Devices and Methods", filed on May 2, 2005, U.S. patent application Ser. No. 11/119,719, entitled (as amended) "3D Pointing Devices with Tilt Compensation and Improved Usability", also filed on May 2, 2005, U.S. patent application Ser. No. 11/119,987, entitled (as amended) "Methods and Devices for Removing Unintentional Movement in 3D Pointing Devices", also filed on May 2, 2005, U.S. patent application Ser. No. 11/119,688, entitled "Methods and Devices for Identifying Users Based on Tremor", also filed on May 2, 2005, and U.S. patent application Ser. No. 11/480,662, entitled "3D Pointing Devices", filed on Jul. 3, 2006, the disclosures of which are incorporated here by reference, for more details regarding exemplary 3D pointing devices which can be used in conjunction with exemplary embodiments of the present invention.

Figure 3B:
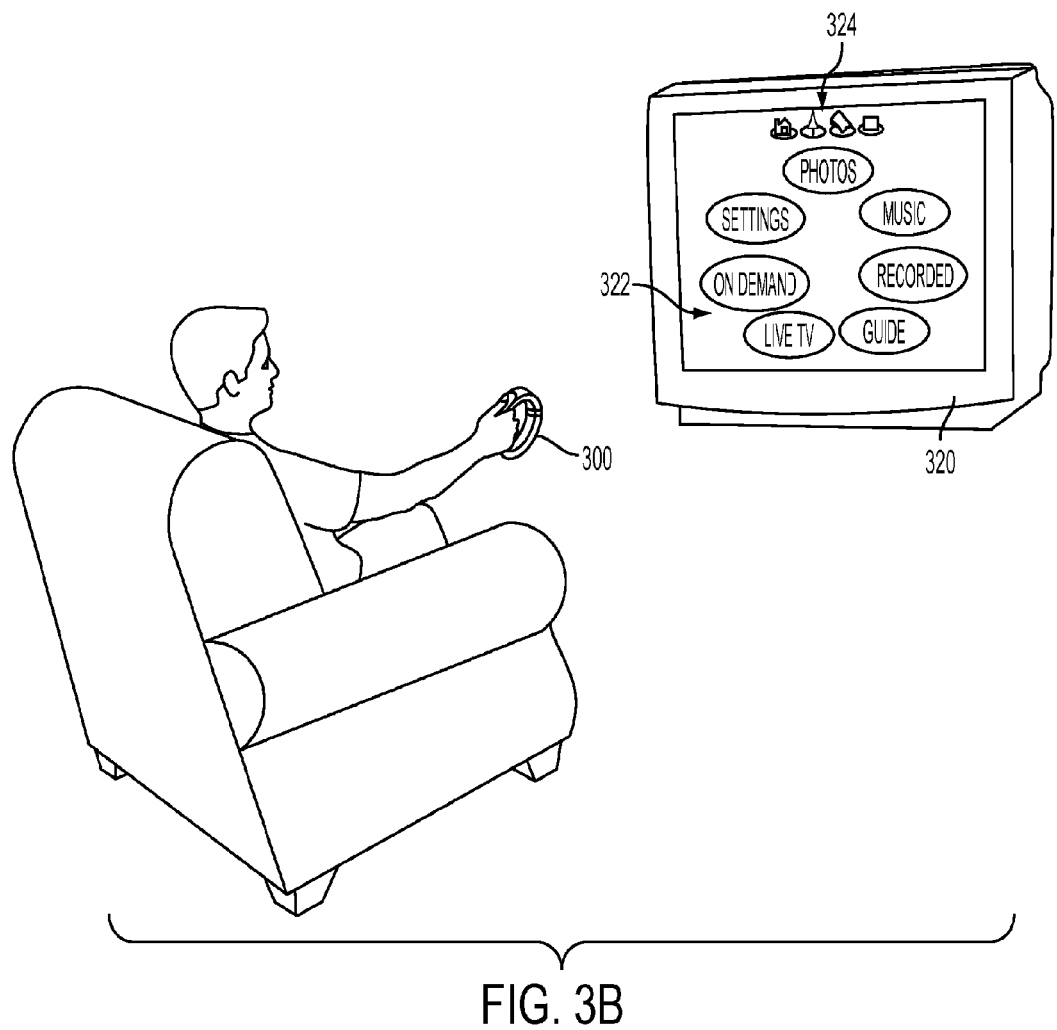
FIG. 3(b) illustrates a user employing a 3D pointing device to provide input to a user interface on a television according to an exemplary embodiment of the present invention.

It is anticipated that 3D pointing devices 300 will be held by a user in front of a display 308 and that motion of the 3D pointing device 300 will be translated by the 3D pointing device into output which is usable to interact with the information displayed on display 308, e.g., to move the cursor 310 on the display 308. For example, such 3D pointing devices and their associated user interfaces can be used to make media selections on a television as shown in FIG. 3(b), which will be described in more detail below. Aspects of exemplary embodiments of the present invention can be optimized to enhance the user's experience of the so-called "10-foot" interface, i.e., a typical distance between a user and his or her television in a living room. For example, interactions between pointing, scrolling, zooming and panning, e.g., using a 3D pointing device and associated user interface, can be optimized for this environment as will be described below, although the present invention is not limited thereto.

Referring again to FIG. 3(a), an exemplary relationship between movement of the 3D pointing device 300 and corresponding cursor movement on a user interface will now be described. Rotation of the 3D pointing device 300 about the y-axis can be sensed by the 3D pointing device 300 and translated into an output usable by the system to move cursor 310 along the $y_2$ axis of the display 308. Likewise, rotation of the 3D pointing device 308 about the z-axis can be sensed by the 3D pointing device 300 and translated into an output usable by the system to move cursor 310 along the $x_2$ axis of the display 308. It will be appreciated that the output of 3D pointing device 300 can be used to interact with the display 308 in a number of ways other than (or in addition to) cursor movement, for example it can control cursor fading, volume or media transport (play, pause, fast-forward and rewind). Additionally, the system can be programmed to recognize gestures, e.g., predetermined movement patterns, to convey commands in addition to cursor movement. Moreover, other input commands, e.g., a zoom-in or zoom-out on a particular region of a display (e.g., actuated by pressing button 302 to zoom-in or button 304 to zoom-out), may also be available to the user.

According to exemplary embodiments of the present invention, user interfaces may use, at least in part, zooming techniques for moving between user interface views. The zooming transition effect can be performed by progressive scaling and displaying of at least some of the UI objects displayed on the current UI view to provide a visual impression of movement of those UI objects away from an observer. In another functional aspect of the present invention, user interfaces may zoom-in in response to user interaction with the user interface which will, likewise, result in the progressive scaling and display of UI objects that provide the visual impression of movement toward an observer. More information relating to zoomable user interfaces can be found in U.S. patent application Ser. No. 10/768,432, filed on Jan. 30, 2004, entitled "A Control Framework with a Zoomable Graphical User Interface for Organizing, Selecting and Launching Media Items", and U.S. patent application Ser. No. 09/829,263, filed on Apr. 9, 2001, entitled "Interactive Content Guide for Television Programming", the disclosures of which are incorporated here by reference.

Movement within the user interface between different user interface views is not limited to zooming Other non-zooming techniques can be used, in addition to zooming or as an alternative thereto, to transition between user interface views. For example, panning can be performed by progressive translation and display of at least some of the user interface objects which are currently displayed in a user interface view. This provides the visual impression of lateral movement of those user interface objects to an observer.

Returning now to the application illustrated in FIG. 3(b), the GUI screen (also referred to herein as a "UI view", which terms refer to a currently displayed set of UI objects) seen on television 320 is a home view. In this particular exemplary embodiment, the home view displays a plurality of applications 322, e.g., "Photos", "Music", "Recorded", "Guide", "Live TV", "On Demand", and "Settings", which are selectable by the user by way of interaction with the user interface via the 3D pointing device 300. Such user interactions can include, for example, pointing, scrolling, clicking or various combinations thereof. For more details regarding exemplary pointing, scrolling and clicking interactions which can be used in conjunction with exemplary embodiments of the present invention, the interested reader is directed to U.S. patent application Ser. No. 11/417,764, entitled "METHODS AND SYSTEMS FOR SCROLLING AND POINTING IN USER INTERFACE", to Frank J. Wroblewski, filed on May 4, 2006, the disclosure of which is incorporated here by reference.

Television Sign-On System

As mentioned above, exemplary embodiments provide a sign-on system and method that allow for the connected TV and devices interface to be personalized to an individual or a group so that various services can accommodate the viewer. Exemplary aspects of the system according to such embodiments include its streamlined login procedure, remote management features, and default behaviors to minimize inadvertent privacy violations in normal system use. Exemplary embodiments define a framework where the user can customize their experience and utilize a variety of access options based upon their personal tastes, interest and experience. Moreover, these embodiments provide for a "casual" security model that is adapted to TV usage and which prevents inadvertent access to another user's information without excessive security controls.

Thus exemplary embodiments provide for security mechanisms and sign-on systems which fulfill the user's or viewer's expectation in a "lean back" TV environment wherein he or she is unlikely to want to engage in extensive interactive actions with the interface. To better exemplify the simple sign on experience and its role in the interactive TV ecosystem according to exemplary embodiments, consider the following exemplary use case.

Suppose that a particular household is comprised of four individuals: two parents, a teen aged daughter and a 10 year-old son. A television (simple) sign-on system according to embodiments is preferably thus designed to accommodate each of these people individually, as well as all the members of the household in different group configurations. The exemplary sign-on system can thus be set up with a default profile of "Family." Whenever the system is turned on, e.g., when the TV 212 or system controller 228 is powered up, or another profile logs out, the default Family profile becomes active. This Family profile, in this illustrative example, has access to the family Netflix and Hulu account (passwords are already embedded and hidden) but it limits views to PG and TV-14 rated content. Purchases from the app store can be made from this Family profile, but the user must enter a PIN to complete the transaction. This way, one of the parents can access a pay-per-view movie for the family from this shared, Family profile without having to change the active profile and the children can use the TV with the Family profile, but without direct access to services or transactions that require extra fees and that may require PIN code entry to access.

Continuing with this illustrative example, suppose that the father sits down late one evening to watch a movie and uses the simple profile agent widget to select his icon and enter his password. This changes the profile to "Dad" in the system from the default "Family" profile. The "Dad" profile may have different permissions/restrictions than the "Family" profile. For example, when he enters the Netflix service, there is no ratings limit and all of the content provided by Netflix is available for viewing. In addition, since the father has purchase privileges built in to his profile in this example, when he finds, for example, an app he wants to buy or a pay-per view movie that he wants to watch, he does not need a PIN to complete the transaction, instead the sign on system is automatic.

On another occasion, the daughter is watching TV alone. Using the profile agent widget, she engages her "Daughter" profile. Now she is able to invoke the Facebook/Twitter overlay so she can see updates in the on-screen ticker that are coming from her personal accounts using her personal access values. This profile according to this example does not allow purchases at all, even with a PIN code. The daughter could go back to the "Family" profile if she surreptitiously learns the PIN code, but she would not be able to add the app to her account or profile without one of the parent administrator's knowledge. When the daughter is done watching, she turns off the TV which automatically returns the profile to the default "Family" when it is turned back on.

It will be appreciated by those skilled in the art that the foregoing example is purely illustrative in the sense that profile parameters and characteristics may vary in any given system implementation depending, for example, upon the manner in which permissions and restrictions are to be allocated among the various individuals and/or groups that are identified for security purposes as potentially wanting to use the TV system. However, at least two particular points are brought out in this example which illustrate significant (but not necessarily required) aspects of the "casual" security model provided by exemplary embodiments. For example, as seen in the example, a user can invoke a secure profile at will but is not forced to always perform a login/logout model to stay protected, e.g., the turning off of the television (which many users have as an ingrained habit when they are finished watching TV) performs the secondary or dual function of logging them out of their personal profile. Second, while it may be possible to circumvent the lightweight security used in some embodiments (e.g., by the discovery of the PIN in the previous example), such an action can be identified and dealt with as is appropriate for any security "breach" that occurs within the family environment.

Figure 4:
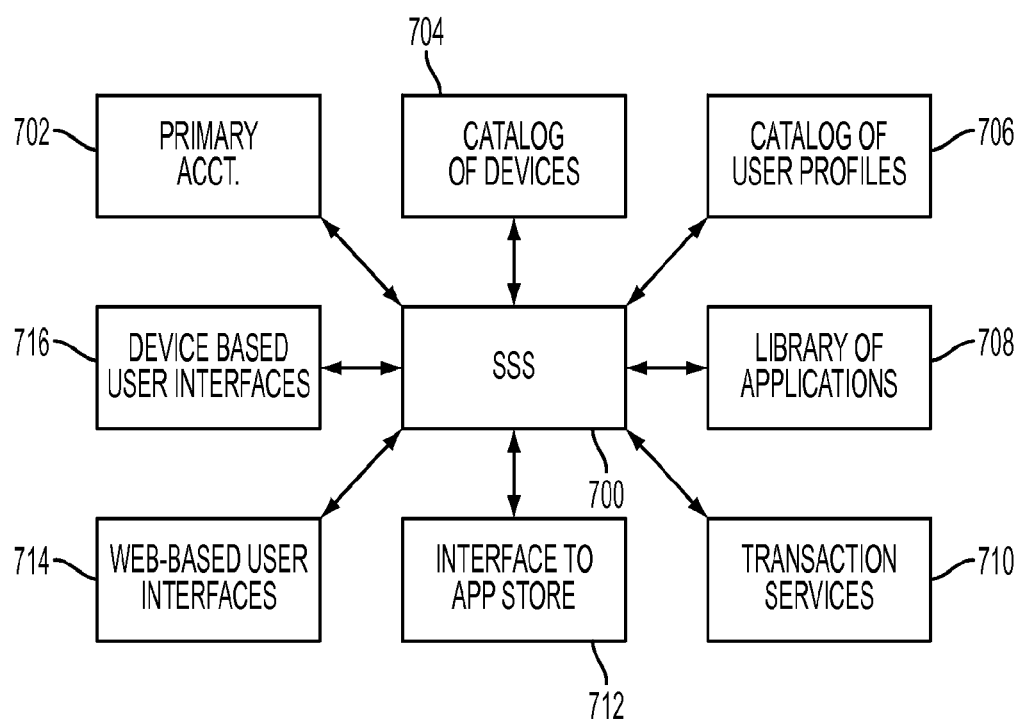
FIG. 4 illustrates an architecture of a television sign-on system according to an exemplary embodiment.

Having provided an illustrative example of a simple sign-on system according to an embodiment, some more details regarding exemplary architectures and functional units of such systems will now be discussed. According to some embodiments, simple sign-on systems can include a set of backend services and client interfaces disposed on a number of platforms as generally illustrated in FIG. 4. Therein, the simple sign-on system 700 according to an embodiment can be broken down into the following components:

1. A primary account 702 accessible from multiple platforms.
2. A catalog of devices 704 attached to (or associated with) the primary account 702.
3. A catalog of user profiles 706 attached to the primary account 702.
4. A library of applications 708 managed by the primary account 702, including stored application-specific data such as the username and password for each application.
5. Transaction services 710 to facilitate and manage commerce.
6. An interface 712 to an application store linked to the primary account.
7. Web-based user interfaces 714 for access and editing.
8. Device-based user interfaces 716 for access and editing.

Each of these exemplary elements of a simple sign-on system according to an exemplary embodiment will now be discussed in more detail.

The shared, primary account 702 is an account that aggregates all members of a household's simple sign-on system according to an embodiment. There is a primary account administrator whose name, location, contact information and primary account password is stored. The primary account also optionally stores payment information (e.g.: credit card or PayPal information) for easy transactions. The payment information can also be PIN-protected so that it can be stored in the account but still require a PIN to complete a transaction. The account administrator(s) also can manage the device catalog 704, user profile catalog 706, and library of applications 708 which are linked to the primary account 702. According to at least some embodiments, the primary account 702 only has one of each of these catalogs/libraries 704, 706 and 708.

The device catalog 704 is used for the management of devices and includes a set of features to facilitate this effort. In order to verify devices, the catalog 704 will generate an initial activation code which can either be entered on the new device's client software, or can be generated by the device for entry in the catalog. There is a visible definition of the device and an internal definition that is used to determine compatibility with applications. Each device has a default name, but the account manager can create a unique name for easier identification. Finally, a device can have a default profile that is different than the default profile defined for the account 702. Devices can include any device managed by the simple sign-on system 700 including, but not limited to televisions and associated media source devices, e.g., an Internet modem, telephone device, DVD, satellite source/tuner, etc.

The catalog of user profiles 704 maintains and manages the "users" defined for the account 702. A user can be an individual, a group, or an abstract naming, and any of these types of users can be associated with a user profile. For example, the default profile in a household system 700 may be "family", as in the example provided above, with no password so that whenever a connected device becomes active, it is in a profile that is safe for all household members or visitors. Profiles are mirrored on client devices where possible so that network unavailability does not prevent usage of the device. Parameters that can be set for a profile include, but are not limited to:

a. Name of profile—a simple string which can be an individual name or set of people.
b. PIN—optional and can be used to allow a profile to access payment options.
c. Payment Authorization—a flag that defines whether this profile can make commerce transactions without needing PIN entry.
d. Icon—An image that is used to identify the profile in non-text contexts.
e. Ratings Level—definition of the maximum rating level the profile has access to, a form of parental control.
f. Login—username and password for the profile.
g. Manager Enabled—a flag that defines whether the profile has administrative access to the primary account.

h. Application Set—the subset of applications in the application library 708 that are accessible to this profile. This also includes the username/password or other login information required by some applications for personal use and applicable only to the specific profile.

i. "Skin" Interface Information—data used to define a personalized appearance on devices which the profile is active.

The application library 708 can, for example, be a representation of the various applications that have been installed for use on the system. The applications themselves may run remotely, so the library 708 can be designed as a database to manage applications that may exist in multiple locations. Paid applications would typically include a stored key to verify their paid status. If an application (eg: Netflix) has a single account that is shared completely by the household, than account settings (username, password, etc) are stored in the application library 708, rather than in individual profiles 706. In this way, all profiles 706 with access to the application that has a single account for the household can use the shared account settings. These settings can only be changed by an account administrator according to this embodiment.

According to an embodiment, any application that is part of any profile is stored in the application library 708. However, a given profile may not have all library applications available to it. For example, some applications may be excluded by choice (and can be added by the profile user at any time), while other applications may be restricted by parental control settings and thus can only be added by an account administrator. The application library 708 also maintains a flag that indicates ability for each application to function on different platforms. For example, a video-based application may be flagged as invalid for an audio-only connected platform. This is used to filter the library view when accessed from platforms that do not support all the applications.

The transaction services 710 (also referred to herein as a "commerce backend") provides an integrated transaction system to facilitate payment for applications, subscriptions and services. Part of this system involves the storage of relevant transaction information (e.g., name, address, credit card, etc.) so that once set, the user can take advantage of a simplified transaction experience, either directly (if using an authorized profile) or through the input of a PIN. Since the account access is available from the web as well as from the connected platform, the account administrator can use a more convenient web-access from a PC to enter the heavy textual information necessary to set up a transaction account.

The application store (and interface 712 thereto) provides an integrated application store model to system 700 which provides users with access to applications, subscriptions and services to be added to the account's application library 708. Purchased items (which can include free items) are added directly to the application library 708 for availability to different profiles 706. Access to the application store 712 is filtered by parental controls in the active profile, so a profile can restrict the view of the application store in the same way it restricts the view of content within applications and applications in the application library.

The web-based interface 714 provides a mechanism by which the simple sign-on system 700 can be accessed and used conveniently from various connected devices, e.g., a families personal computer or PDA which is not directly connected to system 700. As mentioned earlier, some account efforts may be easier to perform when done on a PC instead of on a TV screen with a remote. To facilitate this more convenient and efficient access, the complete system 700 is available via a standard web browser accessed through a PC, or mobile device, using the interface(s) 714. Depending upon the interface capabilities of the connected platform, some account functions may not be available, such as user management on an audio device. All account management, profile, and commerce functionality would typically be available through the web interface 714.

The device based (client-side) user interfaces 716 provide the primary connections to the system 700 via the various connected devices according to this embodiment. Each interface 716 will be scoped according to the capabilities of the device platform with which it is associated. While some devices may have all the features of the system accessible, others may work with a more limited set, requiring the user to go to the web-based interface 714 to handle some tasks. There can, however, be a set of core features which are required for any client-side variant including, for example, the ability to access a profile and "log-in" by some means, e.g., including a PIN entry. The core set of features could also include the ability to select an application from those available in the profile and use that application. Finally, the system 700 includes an "auto log-off" feature which automatically returns the system to a default profile if the system is turned off and on again. User login is a key aspect of the Simple Sign-On system because it should occur as seamlessly as possible to minimize the demand on the user.

As mentioned above, according to exemplary embodiments there will be a default profile that is engaged by each connected system 700. According to at least some embodiments, this default profile has no PIN required for entry, i.e., the system will automatically permit at least some access to the controlled system via the default profile albeit some functionality, e.g., purchasing, may later require PIN entry to be enabled. However, other non-default profiles may require an initial PIN entry to engage the access of the profile, i.e., some non-default profiles may require a PIN entry or other identification input prior to the profile being used at all.

As will be appreciated by the foregoing, casual security measures in accordance with these embodiments are intended to balance ease of use for connected systems (such as the family TV where ease of use, and no or minimal security is traditionally an expectation) and security/control over the rapidly grown number of services which are becoming available on such connected systems. While PIN-entry is overall one easy means of accessing a profile according to the foregoing exemplary embodiments, it will be recognized that there are some other alternatives that could potentially make profile access even more streamlined, such as:

1. Learned Signature: Using a touchpad or in-air gesture device, the user can teach the system a signature that the user can enter at any time in the future to automatically engage a profile. This can be done at any moment, immediately addressing a PIN-entry needed for a purchase, as an example.

2. Tremor Detection: If a device is able to detect individual tremor patterns (such as an in-air gesture device and as described in the above incorporated by reference patent) then these patterns can be identified to automatically offer a profile whenever the tremor is detected during a single session. It could be automatic as well, but the use case is better with a request because if a parent picks up the remote while the family is engaged, they may not want to enter their specific profile at that time.

3. Visual Identification: A more advanced system with built in video capabilities could "watch" the area and identify the individuals who are in position to load the appropriate profile. Since this is a situation where the users can change temporarily (one person leaves and returns a few minutes later) there is a built-in time factor to when the new profile is engaged. A restricted profile may still request the change after this given period of time much like the tremor detection.

Figure 5:
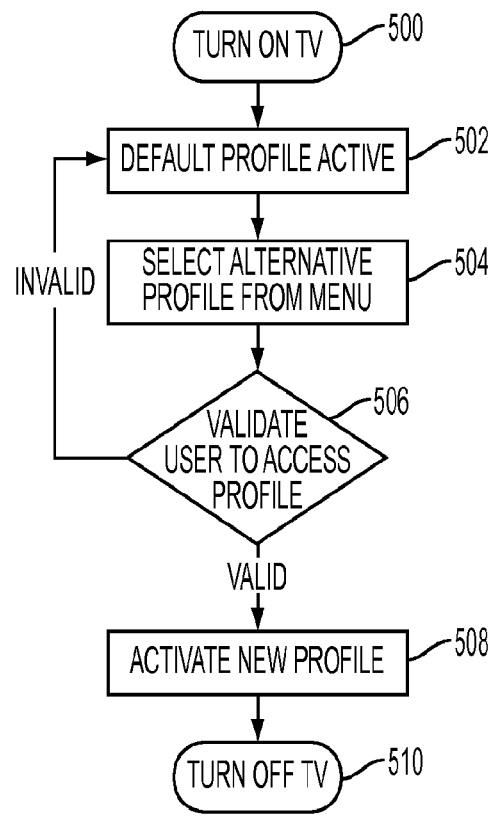
FIG. 5 is a flow chart showing a method for signing on to a television according to an exemplary embodiment.

Thus, for example, a login process according to an exemplary embodiment can include the steps illustrated in the method flowchart of FIG. 5. Therein, at step 500, a user or viewer turns on a television. This results, as shown in step 502, is to activate a default profile which controls the user's access to media content and services via the television based on at least one control parameter associated with the television, e.g., one or more of the parameters set forth above. The user (or group of users) may then select an alternative profile from among other profiles associated with this account in the catalog 706, as shown in step 506. A validation of the user's right to access the alternative profile is performed at step 508. This step 508 can involve, for example, comparing a security identifier associated with the user, and input to the system (e.g., a PIN, tremor measured by a 3D pointing device, or other security inputs or biometric data) to a pre-stored security data item. If the validation process fails, then the default profile is maintained for controlling the system (e.g., the system of FIGS. 2, 3A, and/or 3B). Otherwise, if the user's security input is valid, the flow proceeds to step 508 where the new profile is activated. Then, control of the system, and corresponding access to media content, applications, purchasing, etc., is controlled in accordance with the preset parameters for the newly activated profile. At some point in time, when the user turns off the television, at step 510, this operation (and/or the corresponding next time the system is powered on) operates as an implicit request to logoff from the alternative profile. In this way, the user essentially logs out without requiring a separate step to do so, and the default profile will again become the active profile when the television is turned back on.

Figure 6:
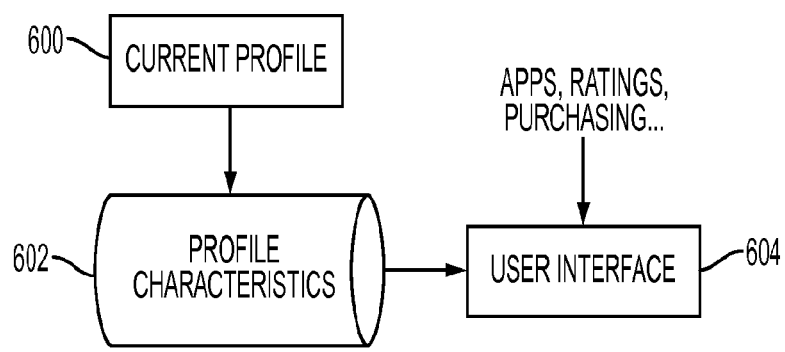
FIG. 6 depicts a data flow according to an embodiment.

FIG. 6 illustrates an exemplary profile data flow associated with control systems in accordance with embodiments. Therein, a current profile provides characteristics or parameters 602 which are used by the user interface 604 associated with, e.g., a television, to control accessibility to applications, programs (based e.g., on ratings), purchasing, as well as potentially other types of media content or services that might warrant a profile by profile selective access control.

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

Numerous variations of the afore-described exemplary embodiments are contemplated. The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, used herein, the article "a" is intended to include one or more items.

What is claimed is:

1. A method for controlling access to media content and services via a system comprising:
   receiving a first input to turn on the system;
   activating a default user profile which permits access to a first set of media content and services via the system without requiring validation of a system user's identity;
   receiving a request to switch from the default user profile to another profile;
   validating the request; and
   activating, if the request is validated, the another profile which permits access to a second set of media content and services via the system that is different from the first set of media content and services,
   wherein both the default user profile and the another user profile each include a purchasing parameter that indicates whether the respective profile enables commercial transactions via the system without requiring a PIN entry, the method further comprising:
   receiving an input requesting a commercial transaction; and
   selectively permitting the commercial transaction to be processed via the system based upon the purchasing parameter of the profile which is active at the time that the input requesting the commercial transaction is received, wherein both the default user profile and the another user profile include an application parameter which identifies a subset of applications which are accessible when the system is operating in conjunction with the respective profile, the method further comprising:
   filtering said subset of applications which are accessible based upon the application parameter in a currently active profile based on whether any of said subset of accessible applications are able to operate on a currently active platform connected to the system; and
   displaying only application icons representing said filtered subset of accessible applications which are able to operate on the currently active platform connected to the system.

2. The method of claim 1, further comprising:
   receiving a second input to turn off the system;
   receiving a third input to turn on the system; and
   activating the default user profile to control access to the system in response to the third input, wherein the second input operates as an implicit logoff of the another user profile.

3. The method of claim 1, wherein both the default user profile and the another user profile include a ratings parameter which identifies a maximum rating level associated with media content that can be accessed by the currently active profile.

4. The method of claim 1, wherein the step of validating the request further comprises at least one of: (a) comparing an input PIN with a stored PIN associated with the another profile; and (b) obtaining identifying information associated with a user who is currently using the system and comparing that identifying information with stored identity information associated with the another profile.

5. The method of claim 1, wherein the system includes a television.

6. A controller for controlling access to media content and services through a television, the controller comprising:

at least one interface configured to receive inputs from a user; and a processor configured to receiving a first input associated with turning on the television and, in response to the first input, further configured to activate a default user profile which permits access to a first set of media content and services via the television without requiring validation of a system user's identity;

wherein the at least one interface is further configured to subsequently receive a request to switch from the default user profile to another profile; and wherein the processor is further configured to validate the request and to activate, if the request is validated, the another profile which permits access to a second set of media content and services via the system that is different from the first set of media content and services, wherein both the default user profile and the another user profile each include a purchasing parameter that indicates whether the respective profile enables commercial transactions via the system without requiring a PIN entry and wherein the processor is further configured to selectively permit or deny commercial transactions through the television to be performed based upon the purchasing parameter associated with a currently active one of the default user profile and the another user profile, wherein both the default user profile and the another user profile include an application parameter which identifies a subset of applications which are accessible when the system is operating in conjunction with the respective profile, wherein the processor is further configured to generate signals for filtering said subset of applications which are accessible based upon the application parameter in a currently active profile based on whether any of said subset of accessible applications are able to operate on a currently active platform of the television, and displaying only application icons representing said filtered subset of accessible applications which are able to operate on the currently active platform of the television.

7. The controller of claim 6, wherein the at least one interface is further configured to receive a second input to turn off the system and then to receive a third input to turn on the system, and wherein the processor is further configured to activate the default user profile to control access to the system in response to the third input, wherein the second input operates as an implicit logoff of the another user profile.

8. The controller claim 6, wherein both the default user profile and the another user profile include a ratings parameter which identifies a maximum rating level associated with media content that can be accessed by the currently active profile, and wherein the processor is further configured to permit access to media content via the television based on the ratings parameter of a currently active one of the default user profile and the another user profile.

9. The controller of claim 6, wherein processor is further configured to validate the request by performing at least one: (a) comparing an input PIN with a stored PIN associated with the another profile; and (b) obtaining identifying information associated with a user who is currently using the system and comparing that identifying information with stored identity information associated with the another profile.

10. The controller of claim 6, wherein the controller is integrated into the television.

11. The controller of claim 6, wherein the controller is disposed in a separate housing from the television and is communicatively connected to the television.

12. A television comprising:

a display configured to display media content and service content which is accessible via a user interface; and a processor configured to generate a user interface, and control access to said media content and service content, in accordance with a currently active user profile;

wherein the processor is further configured to use a default user profile as the currently active user profile upon power on of the television, wherein the currently active user profile includes a purchasing parameter that indicates whether the currently active user profile enables commercial transactions via the television without requiring a PIN entry, and wherein the processor is further configured to selectively permit or deny commercial transactions through the television to be performed based upon the purchasing parameter associated with the currently active user profile, wherein both the default user profile and the another user profile include an application parameter which identifies a subset of applications which are accessible when the system is operating in conjunction with the respective profile, wherein the processor is further configured to generate signals for filtering said subset of applications which are accessible based upon the application parameter in a currently active profile based on whether any of said subset of accessible applications are able to operate on a currently active platform of the television, and displaying only those application icons representing said filtered subset of accessible applications which are able to operate on the currently active platform of the television, wherein the processor is further configured to use the default user profile as the currently active user profile upon power on of the television automatically without any additional inputs from a user, wherein the processor is further configured to enable switching the currently active user profile from the default user profile to another user profile upon receipt of validated user identity information.

13. The television of claim 12, wherein the processor is further configured to control the television using the default user profile whenever the television is restarted.

14. The television of claim 12 further comprising a controller.

* * * * *